United States Patent [19]
Manabe et al.

[11] Patent Number: 5,633,755
[45] Date of Patent: May 27, 1997

[54] PROJECTION APPARATUS AND METHOD

[75] Inventors: Yuji Manabe, Kamakura; Kazuya Okamoto; Yutaka Iwasaki, both of Yokohama; Yukiharu Okubo, Kawasaki, all of Japan

[73] Assignee: Nikon Corporation, Tokyo, Japan

[21] Appl. No.: 611,304

[22] Filed: Mar. 5, 1996

[30]       Foreign Application Priority Data

Mar. 8, 1995  [JP]  Japan ................................. 7-077328

[51] Int. Cl.$^6$ ........................................... G03B 21/28
[52] U.S. Cl. .................. 359/443; 359/224; 359/230; 355/67; 348/789; 348/791; 348/744
[58] Field of Search ........................... 359/443, 453, 359/456, 460, 224, 230; 355/67; 348/789, 791, 744

[56]            References Cited

PUBLICATIONS

Hornbeck, "Deformable–Mirror Spatial Light Modulators," *SPIE Critical Reviews Series* 1150:86–102 (1990).
Mignardi, "Digital Micromirror Array for Projection TV," *Solid State Tech.*, pp. 63–68, (1994).
Sampsell, "Late–News Paper: An Overview of the Digital Micromirror Device (DMD) and Its Application to Projection Displays," *SID 93 Digest*, pp. 1012–1015, (1993).

*Primary Examiner*—Safet Metjahic
*Assistant Examiner*—D. P. Malley
*Attorney, Agent, or Firm*—Klarquist Sparkman Campbell Leigh & Whinston, LLP

[57]              ABSTRACT

A projection apparatus is disclosed that can be used for projection TV and related applications. The apparatus comprises a light source, a projection optical system, a DMD with multiple micromirrors, and a controller for individually controlling the tilt of the micromirrors. The projection optical system comprises, in order from the DMD side, a first lens group, an aperture stop, and a second lens group. An illumination stop is situated between the first and second lens groups. Light from the light source passes through the illumination stop and the first lens group to impinge on the DMD. The controller coordinatedly controls the tilt of the micromirrors in the DMD so that the impinging light is selectively reflected to one or the other of the aperture stop and the illumination stop, thereby eliminating ghost-forming reflections of light not projected onto a screen.

14 Claims, 3 Drawing Sheets

PROJECTION APPARATUS AND METHOD

FIELD OF THE INVENTION

This invention pertains to a projection apparatus, particularly to a projection apparatus comprising a DMD (digital micromirror device) employed as a spatial light modulator.

BACKGROUND OF THE INVENTION

Projection systems in many conventional projection apparatus comprise an LCD (liquid crystal display) to perform phase modulation or scattering modulation of the light.

New projection systems have been proposed that employ a DMD (digital micromirror device or deformable micromirror device) as the spatial light modulator. DMDs, as proposed in recent years, are disclosed, for example, Mignardi, "Digital Micromirror Array for Projection TV," *Solid State Technology*, July 1994, pp. 63–68; Sampsell, "An Overview of the Digital Micromirror Device (DMD) and Its Application to Projection Displays," *SID 93 Digest*, pp. 1012–1015; and Hornbeck, "Deformable-Mirror Spatial Light Modulators," *SPIE Critical Reviews Series*, Volume 1150, pp. 86–102, all of which references being incorporated herein by reference. DMDs typically comprise multiple micromirrors arrayed as a matrix on a substrate. DMDs are constructed so that the orientation of each micromirror is independently driven and controlled. The typical dimension of each micromirror is about 25 µm×25 µm, and one DMD can comprise, e.g., from several ten to several million micromirrors, depending upon application.

FIG. 1 is a schematic illustration, in a conventional projection system employing a DMD as a spatial light modulator, of general principles of operation of a micromirror. As discussed above, the DMD comprises a large number of individual micromirrors 22, each micromirror corresponding to an individual pixel of video data to be projected onto a screen (not shown) by a projection lens 21. The lens 21 is disposed a distance away from the micromirror array along an optical axis AX. Each micromirror 22 is illuminated with incident light impinging at an angle to the optical axis AX.

The angle of each micromirror is independently controlled. I.e., each micromirror is independently tiltable relative to the optical axis AX. At an appropriate tilt, as indicated by the dashed line in FIG. 1, light is reflected into the projection lens 21 and is directed onto a screen. Whenever the micromirror 22 is oriented perpendicularly to the optical axis AX, as indicated by the solid line in FIG. 1, light is reflected away from the lens 21 and does not reach the screen. Thus, a light/dark pattern of pixels can be formed on the screen as a video image according to the particularly tilt pattern of individual micromirrors in the DMD at a particular instant in time. Changing the tilt pattern as a function of time produces a moving image on the screen.

Thus, in a conventional projection system employing a DMD as a spatial light modulator, as described above, unwanted light is regularly reflected by certain micromirrors toward a location away from the aperture of the lens 21. Since the reflecting power of the micromirrors is extremely high, light reflected by the micromirrors away from the projection lens aperture has a high intensity and strong directivity. Unfortunately, it is difficult to prevent this reflected light from scattering or irregularly reflecting inside the optical system housing. Such stray light is a substantial factor in the production of "ghosts," which decrease the contrast of the image on the screen.

SUMMARY OF THE INVENTION

An object of this invention is to provide projection apparatus and methods capable of producing, from a DMD through a projection lens onto a screen, a projected image having superior contrast by preventing light reflected by the DMD away from the projection lens from reaching the screen.

The foregoing object is met by a projection apparatus according to the present invention. According to a preferred embodiment, a projection apparatus is provided that comprises a light source, a projection optical system, a DMD with multiple micromirrors and a controller. The projection optical system comprises, in order from the "DMD side" on an optical axis, a first lens group, an aperture stop and a second lens group. In addition, an illumination stop is disposed between the first lens group and the second lens group. Light from the light source passes through the illumination stop and the first lens group toward the DMD. The controller controls the orientation of each micromirror in the DMD in a coordinated manner so that each micromirror reflects light either toward the aperture stop or the illumination stop.

The foregoing object is also met by methods according to the present invention for reducing ghosts in an image projected from a DMD. A preferred embodiment of the method comprises: (a) illuminating the micromirrors of the DMD with light generated by a light source and passed through an illumination stop and a first lens group; (b) providing an aperture stop for receiving light reflected from the DMD through the first lens group; and (c) independently controlling the micromirrors on the DMD to selectively assume an ON orientation or an OFF orientation, wherein light reflected from micromirrors in the ON orientation are directed by the first lens group to the aperture stop to become the image, and light reflected from micromirrors in the OFF orientation are directed by the first lens group to the illumination stop.

Additional purposes, characteristics and benefits of this invention shall become clear in the following description, referring to the attached figures.

DETAILED DESCRIPTION OF PREFERRED EMBODIMENTS

Figures 1, 2:
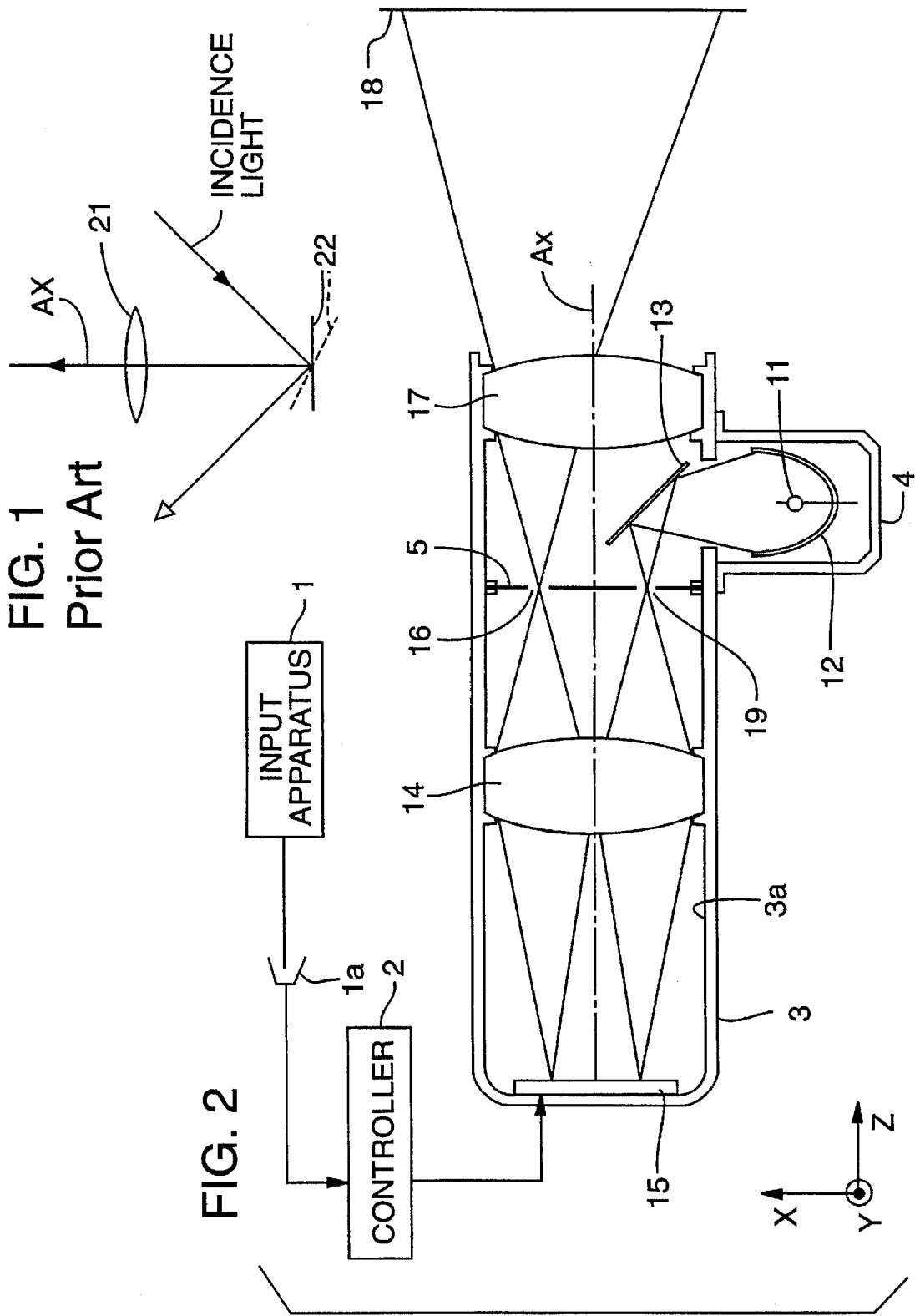
FIG. 1 schematically illustrates, in a prior art projection apparatus employing a DMD as a spatial light modulator, general principles of operation of one of the micromirrors in the DMD.
FIG. 2 schematically illustrates general aspects of a projection apparatus according to a preferred embodiment of the present invention.

Reference is first made to FIG. 2 that schematically illustrates, inter alia, structural aspects of a preferred embodiment of a projection apparatus. In FIG. 2, conventional Cartesian coordinates are used, wherein the X, Y, and Z axes are oriented as indicated. The projection apparatus comprises a first housing 4 enclosing a light source 11 and a mirror 12 having a suitable shape (preferably ellipsoidal). A second housing 3 encloses the projection optical system. The projection optical system comprises a first lens group 14, a stop plate 5, a second lens group 17, and a DMD 15 or analogous device. A controller 2 is provided for controlling the tilt angle of each of the multiple micromirrors (not shown) in the DMD 15.

The light source 11 emits light from a location at the primary focal point of the mirror 12. Light reflected (indicated by rays 20) by the mirrors 12 and 13 converges at a secondary focal point 21 of the mirror 12, at which secondary focal point 21 an image of the light source is formed. The stop plate 5 is opaque to the light, but defines a first aperture 19 of a suitable diameter therethrough that functions as an "illumination stop." Thus, the illumination stop 19 is situated at the location of the image of the light source formed by light reflected by the mirror 12.

As shown in FIG. 2, the illumination stop 19 is also situated at the focal point, along the +Z dimension, of the first lens group 14. The first lens group 14 collimates light from the light-source image at the illumination stop 19 and directs the collimated light so as to impinge on the DMD 15 at an angle α to the Z-axis. In other words, the DMD 15 is illuminated by the first lens group 14 at an angle α by Koehler illumination.

Figure 3:
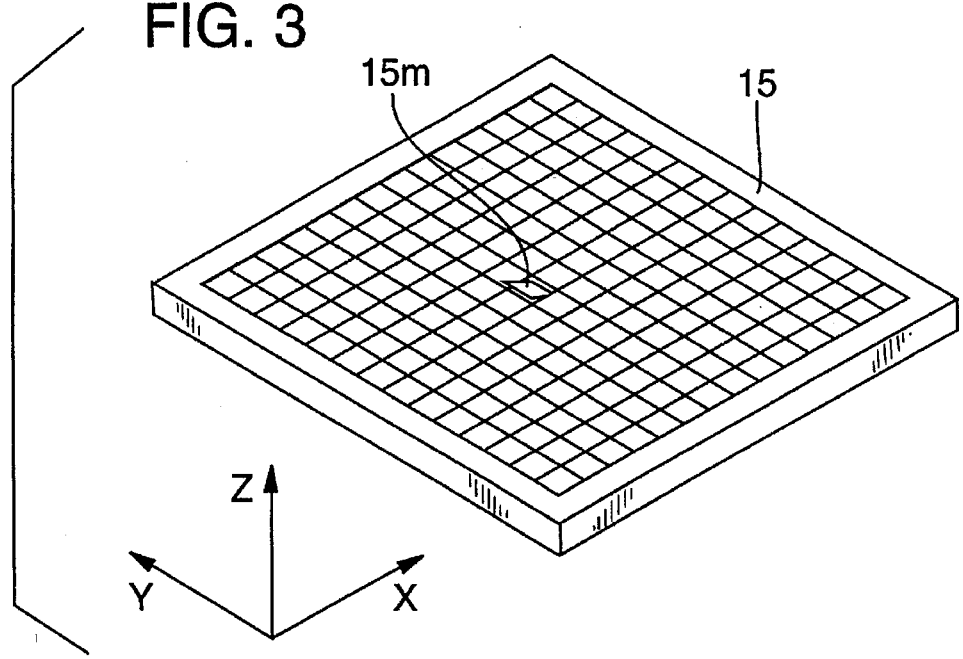
FIG. 3 illustrates certain features of a DMD as used in the preferred embodiment.

The DMD 15, which comprises a large number of individually controllable micromirrors 15a, is shown schematically in FIG. 3, wherein the same Cartesian coordinates as in FIG. 2 are used. The multiple micromirrors 15a are arrayed in a matrix in the XY plane. Each micromirror 15a can be tilted about a line parallel to the Y axis, the angle of inclination being determined by the controller 2 (not shown in FIG. 3). Each micromirror 15a corresponds to a single pixel.

In the DMD 15 shown in FIG. 3, each micromirror 15a is effectively mounted, for tilting purposes, on a 90°-type torsion beam; however, it is also possible for each micromirror 15a to be effectively mounted on a 45°-type torsion beam or on a cantilever beam. Such types of mountings, as well as others, are disclosed in, for example, Mignardi, "Digital Micromirror Array for Projection TV," *Solid State Technology*, July 1994, pp. 63–68; Sampsell, "An Overview of the Digital Micromirror Device (DMD) and Its Application to Projection Displays," *SID 93 Digest*, pp. 1012–1015; and Hornbeck, "Deformable-Mirror Spatial Light Modulators," *SPIE Critical Reviews Series*, Volume 1150, pp. 86–102, all of which references being incorporated herein by reference. Any of the DMD devices disclosed in the foregoing references can be used as the DMD of the FIG. 2 embodiment.

Figure 4:
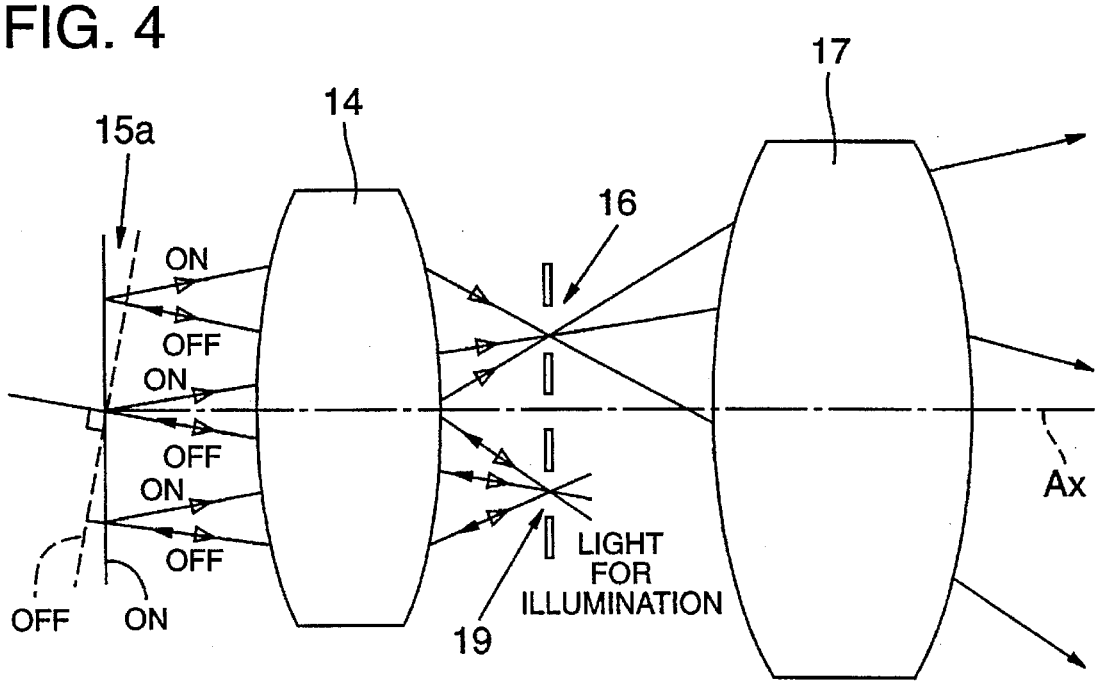
FIG. 4 illustrates aspects of the operating principles of the FIG. 2 embodiment.

FIG. 4 illustrates aspects of the operating principles of a projection apparatus as shown in FIG. 2. For simplicity and clarity, FIG. 4 shows only one of the micromirrors 15a from the DMD. Also, even though a screen is not illustrated in FIG. 4, a person of ordinary skill in the relevant art would understand that a screen would normally be situated to the right in FIG. 4.

Referring further to FIG. 4, the projection optical system comprises the first lens group 14; the illumination stop 19 situated in the focal plane on the screen-side of the first lens group 14; an aperture stop 16; and the second lens group 17. Thus, the projection optical system shown in FIG. 4 is telecentric on the DMD side (i.e., the micromirror-15a side). Illumination light from the light source (not shown in FIG. 4), after forming a light-source image at the position of the illumination stop 19, is refracted into an essentially parallel light flux by the first lens group 14 and thus reaches the micromirrors 15a of the DMD.

The tilt of each micromirror 15a is controlled by the controller (shown in FIG. 2) so as to be either in an "ON" state (FIG. 4, solid line) or an "OFF" state (FIG. 4, dotted line). When the micromirror 15a is in the ON state, the normal line of the micromirror 15a is parallel to the optical axis Ax of the projection optical system. In the ON state, illumination light reaching the micromirror 15a, after passing again through the first lens group 14, converges at the aperture stop 16. The aperture stop 16 is defined by the stop plate 5 at a symmetrical location on the opposite side of the optical axis Ax from the illumination stop 19. Thus, a full-size image of the illumination stop 19 is formed by the first lens group 14 at the aperture stop 16. The diameter of the aperture stop 16 is preferably either the same as or slightly larger than the diameter of the illumination stop 19. In this way, light reflected by a micromirror 15a in the ON state is directed by the first lens group 14 into the second lens group 17 without being eclipsed by the aperture stop 16; the second lens group 17 directs the light onto the screen (not shown).

Whenever the micromirror 15a is in the OFF state, the normal line of the micromirror 15a becomes parallel with the principal ray (line 22 in FIG. 4) of the incident light into the micromirror 15a. Light reflected from micromirrors in the OFF state thus propagates back along the same path as the incident light and is refracted by the first lens group to converge at the illumination stop 19. As a result, a full-sized image of the illumination stop 19 is formed on the illumination stop 19 by reflected light from OFF micromirrors. As can be readily seen in FIG. 4, this returned light from OFF micromirrors propagates along a path (toward the illumination stop 19) that is different from the path along which light from ON micromirrors propagates (toward the aperture stop 16). Also, and most importantly, the light reflected from OFF micromirrors does not simply scatter uncontrollably in various directions such as to housing walls. This minimizes the amount of errant reflected and scattered light so that only light necessary for image formation reaches the screen without any decrease in contrast of the image on the screen.

Turning again to FIG. 2, the DMD in a preferred embodiment of the projection apparatus is operably connected to a suitable controller 2. The controller 2 is adapted, via a terminal 1a or the like, to receive video data from a video input apparatus (video data generator) 1. The video data is normally arranged by pixels. Upon receiving the video data, the controller 2 links each pixel with a particular micromirror on the DMD 15 and controls whether or not, in a given instant in time, to tilt the micromirror 15a to either to the ON state or the OFF state. The controller 2 thus independently drives each micromirror 15a so as to enable all the micromirrors in the DMD to collectively form an image.

Substantially all light reflected by micromirrors in the OFF state, i.e., light "unnecessary" for image formation on the screen at a particular instant, passes through the first lens group 14 and is returned to the illumination stop 19, forming a full-size image on the illumination stop 19 itself. In this way, substantially all the "unnecessary" light, passing through the illumination stop 19, is returned via the mirrors 13 and 12 to the light source 11. As a result, there is no scattering of "unnecessary" light from, for example, interior walls 3a of the housing 3.

Meanwhile, at the particular instant in time, substantially all light reflected by micromirrors in the ON state propagate through the first lens group 14 to form a full-size image of the illumination stop 19 at the aperture stop 16. (Actually, as a person of ordinary skill in the art will appreciate, a Fourier transform of the image of the array of ON-state micromirrors in the DMD 15 is formed.) Since the diameter of the aperture stop 16 is either the same as or slightly larger than diameter of the illumination stop 19, as described above, substantially all the light reflected from the ON-state micromirrors 15a in the DMD 15 is projected via the second lens group 17 onto the screen. Thus, a light/dark pattern corresponding to the pattern, at a given instant in time, of ON- and OFF-state micromirrors 15a in the DMD 15 is formed as a video image on the screen.

Since unnecessary light is efficiently returned to the light source 11 via the first lens group 14 and the illumination stop 19, any unnecessary light reaching the screen is kept to a minimum. This makes it possible to obtain, on the screen, images having superior contrast and very little brightness irregularity.

As will be understood by persons of ordinary skill in the art, the input apparatus 1 is operable to read video data from any of various recording media such as, but not necessarily limited to, magnetic recording media (e.g., floppy disk or video tape), optical recording media (e.g., CD-ROM or MO), or electrical recording media (e.g., IC card). The input apparatus 1 can be separate from and independently connectable to a projection apparatus according to the present invention, or incorporated into the projection apparatus.

Figure 5A:
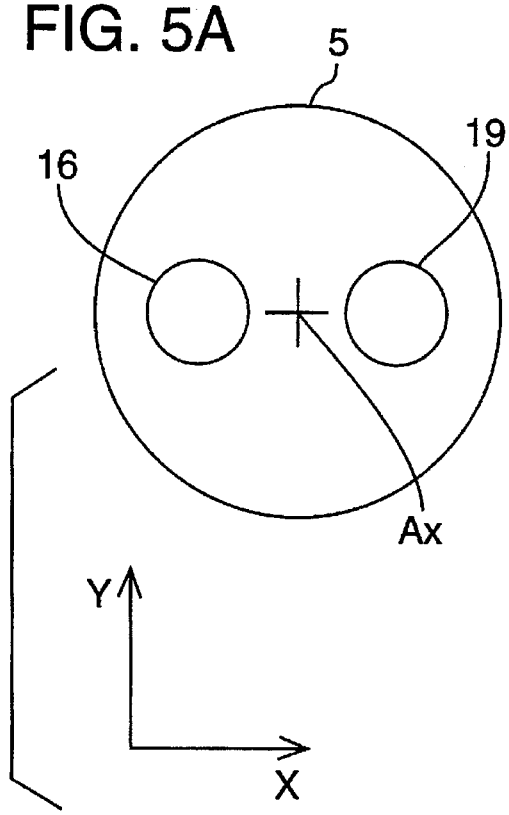
FIGS. 5A and 5B illustrate two possible orientations, relative to the X and Y axes, of the illumination and aperture stops defined by the stop plate in the FIG. 2 embodiment.
Figure 5B:
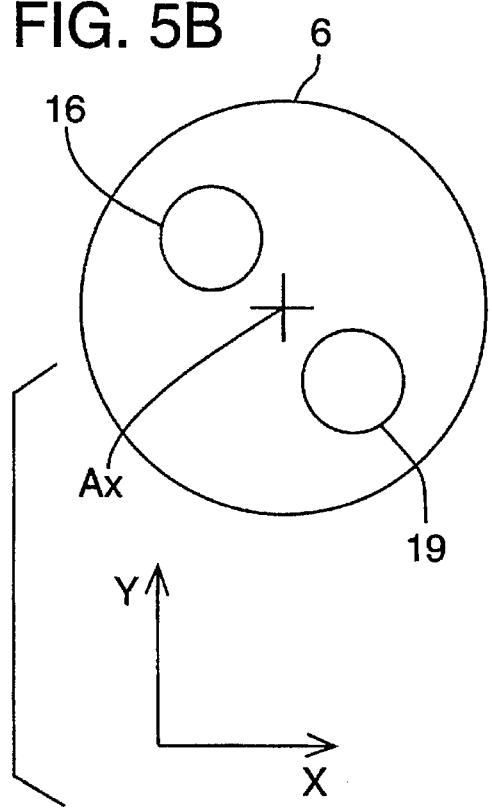

If micromirrors 15a that pivot about Y axes are used in the DMD 15, the aperture stop 16 and illumination stop 19 in the stop plate 5 can be arranged along the X axis, as shown in FIG. 5A. If 45° torsion-beam micromirrors (wherein the tilt axis is inclined 45° clockwise from the Y axis) are used in the DMD, a stop plate 6 can be used in which the aperture stop 16 and illumination stop 19 are arranged on a line oriented 45° from the X axis, as shown in FIG. 5B. In other words, in the 45° instance, the aperture stop 16 and the illumination stop 19 can be arranged along a line that is parallel with the tilt axes of the various micromirrors in the DMD 15 thus have a linearly symmetrical relationship with an axis including the optical axis Ax.

In the embodiment of FIGS. 2–4, illumination light impinging on the various micromirrors 15a in the DMD 15 advantageously has the same angle of incidence on each micromirror. In addition, since the projection optical system of FIGS. 2–4 is telecentric on the DMD side, the angle of the primary ray of the projection optical system is constant at each micromirror, regardless of the tilt positions of the micromirrors. Thus, the controller can control the micromirrors at a constant angle that is independent of the tilt positions of the micromirrors 15a in the DMD 15. This advantageously simplifies the controller 2.

If an optical system not telecentric on the DMD 15 side were to be used as the projection optical system, i.e., if the aperture stop 16 between the first lens group 14 and the second lens group 17 were not at the focal plane on the front side of the first lens group 14 (i.e., the focal plane on the screen-18 side of the first lens group), it would be preferable to place the illumination stop 19 at the focal plane on the front side (i.e., screen-18 side) of the first lens group 14. Since, in such an instance, the aperture stop 16 and the illumination stop 19 would not be in an optically paired relationship, when the various micromirrors 15a in the DMD are placed in the ON state, a defocused (i.e., out-of-focus) image of the illumination stop would be formed. Consequently, the diameter of the aperture stop 16 would have to be a diameter capable of accommodating the defocused image of the illumination stop 19. In addition, in such an instance, the angle of the primary ray of the projection optical system would differ depending on the distance of each micromirror 15a of the DMD 15 from the optical axis Ax. Because of this, the various micromirrors would have to be controlled so that the tilt angle of each micromirror 15a when in the ON state is different depending upon the angle of the principal ray. Thus, a more complex controller would be required.

In a projection apparatus according to the present invention, as described above, it is not necessary to use black paint on housing interior walls or to create a special light trap in order to absorb the intense "unnecessary" light reflected from OFF-state micromirrors.

It is possible to project color video images using the projection apparatus of FIG. 2 or any other embodiment of the present invention. For example, a switchable 3-color (red, green, blue) filter array can be disposed in the light path traveling from the light source 11 to the first lens group 14. Such a filter array can be mounted on a turret rotatable around a desired axis so that selectively position a filter in the light path. The controller 2 would control the micromirrors 15a of the DMD 15 according to which color light was reaching the DMD 15 through the filter array. Synchronization of the filter array and the controller 2 can be accomplished by open-loop control of a pulse motor actuating the turret, or by closed-loop control wherein a photo-interpreter is mounted on the turret and the various micromirrors 15a are controlled by signals from the photo-interpreter. A representative scheme for color projection that can be used in a projection apparatus according to the present invention is disclosed in the Mignardi reference cited above.

Alternatively to the 3-color switching described above, a structure can be employed in which three separate color light paths are created using a dichroic mirror (or prism), with a DMD situated in each of the three light paths as described above for a single light path.

In any of the foregoing embodiments, an optical integrator can be situated if desired between the light source 11 and the illumination stop 19 in order to make the light intensity distribution uniform.

The foregoing detailed description is for the purpose of clarifying the technical content of this invention, and this invention is not to be narrowly interpreted as being limited to the embodiments described above. It is to be understood that the invention can be variously modified within the intent of this invention and the scope thereof as described in the claims.

What is claimed is:

1. A projection apparatus, comprising:

(a) a light source;

(b) a DMD having micromirrors;

(c) a projection optical system comprising a first lens group, an illumination stop, and an aperture stop; and (d) a controller;

(e) wherein light from the light source passes through the illumination stop and first lens group to the DMD, and the controller individually controls the orientation of each micromirror of the DMD so that light impinging on the DMD is selectively reflected by any of the micromirrors through the first lens group toward either the aperture stop or the illumination stop.

2. The projection apparatus of claim 1, wherein the projection optical system has a DMD side and is telecentric on the DMD side.

3. The projection apparatus of claim 1, wherein the first lens group has a front side, and the illumination stop is situated at a focal plane of and disposed on the front side of the first lens group.

4. The projection apparatus of claim 3, wherein the aperture stop is situated at the focal plane of and on the front side of the first lens group.

5. The projection apparatus of claim 1, wherein the aperture stop and the illumination stop are situated symmetrically around an optical axis of the projection optical system.

6. The projection apparatus of claim 5, wherein the aperture stop and the illumination stop are defined by a planar stop plate disposed normally to the optical axis.

7. The projection apparatus of claim 1, further comprising a light-converging system operable to converge light from the light source, the light-converging system being arranged so as to form a light-source image at the illumination stop.

8. The projection apparatus of claim 1, wherein the controller is operable to receive video data.

9. The projection apparatus of claim 1, further comprising a second lens group disposed between the aperture stop and a viewing screen, the second lens group being operable for refracting light passing through the aperture stop to the viewing screen.

10. A projection apparatus, comprising:
 (a) a light source;
 (b) a DMD including micromirrors;
 (c) a projection optical system comprising a first lens group and a second lens group, with an aperture stop and an illumination stop disposed between the first and second lens groups, the projection optical system being operable to direct light from the light source through the illumination stop and first lens group to the DMD and from the DMD through the first lens group, aperture stop, and second lens group to a viewing surface; and
 (d) a controller;
 (e) wherein light from the light source sequentially passes through the illumination stop and the first lens group so as to impinge on the DMD, the controller individually controlling the orientation of each micromirror in the DMD so that the light impinging on the DMD can be selectively reflected by any of the micromirrors toward either the illumination stop to inhibit light scattering or the aperture stop for refraction by the second lens group to a viewing screen.

11. The projection apparatus of claim 10, wherein the controller operates to cause each micromirror to independently tilt to either an ON state or an OFF state, wherein light reflected from OFF-state micromirrors is directed by the first lens group to the illumination stop, and light reflected from ON-state micromirrors is directed by the first lens group to the aperture stop.

12. The projection apparatus of claim 11, further comprising a viewing screen disposed so as to receive light conducted by the second lens group.

13. The projection apparatus of claim 11, further comprising a video data apparatus connected to the controller, the video data apparatus being operable to provide video data to the controller suitable to create an image-creating pattern of ON and OFF micromirrors on the DMD.

14. A method for reducing ghosts in an image projected from a DMD comprised of micromirrors, the method comprising:
 (a) illuminating the micromirrors of the DMD with light generated by a light source and passed through an illumination stop and a first lens group;
 (b) providing an aperture stop for receiving light reflected from the DMD through the first lens group; and
 (c) independently controlling the micromirrors on the DMD to selectively assume an ON orientation or an OFF orientation, wherein light reflected from micromirrors in the ON orientation are directed by the first lens group to the aperture stop to become the image, and light reflected from micromirrors in the OFF orientation are directed by the first lens group to the illumination stop.

* * * * *